April 22, 1958  H. O. GUMMERE ET AL  2,831,501
AIR SUPPLY SYSTEM FOR PNEUMATIC TOOLS
Filed July 20, 1955  3 Sheets-Sheet 2
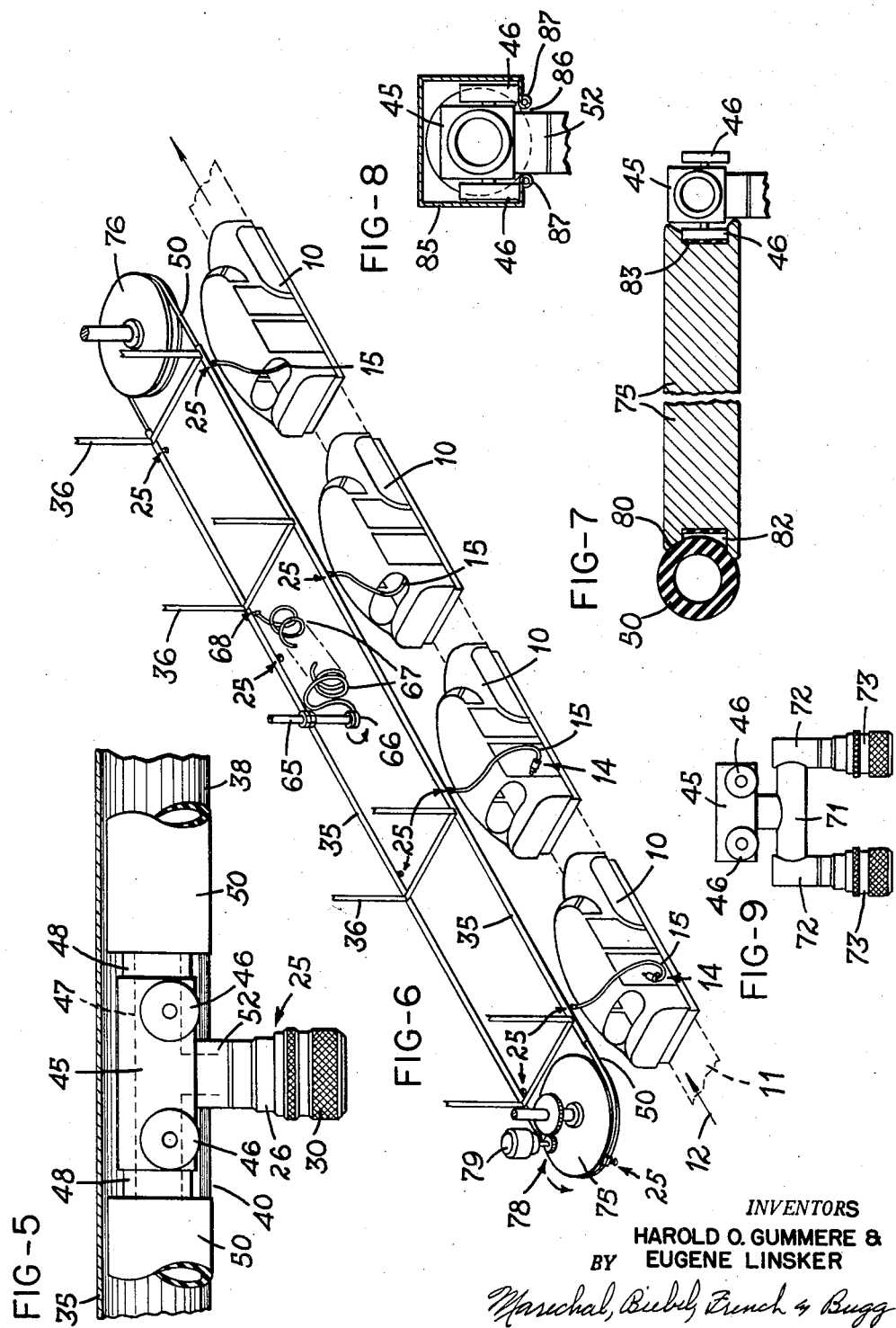
INVENTORS
HAROLD O. GUMMERE &
BY EUGENE LINSKER
ATTORNEYS

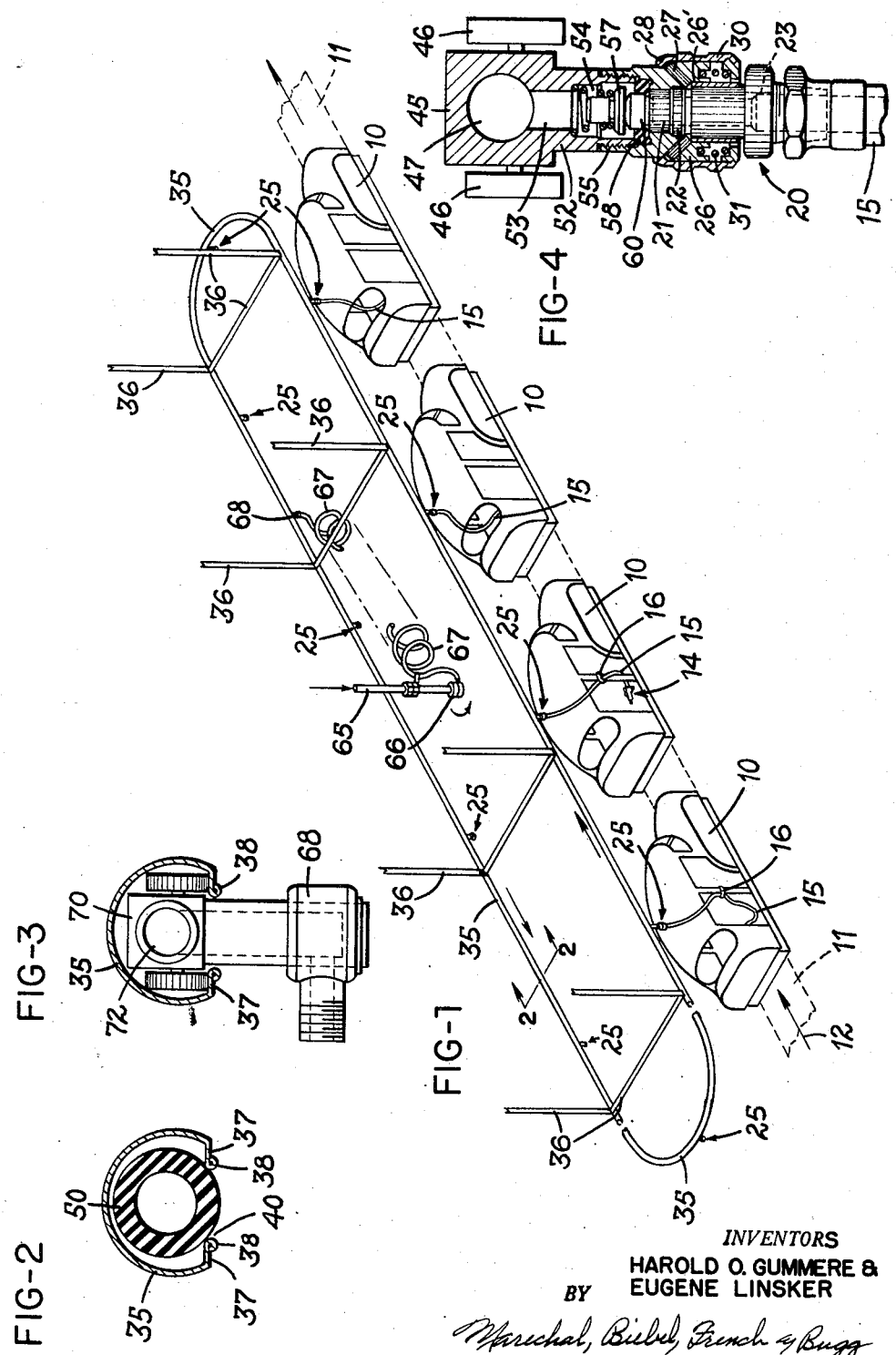

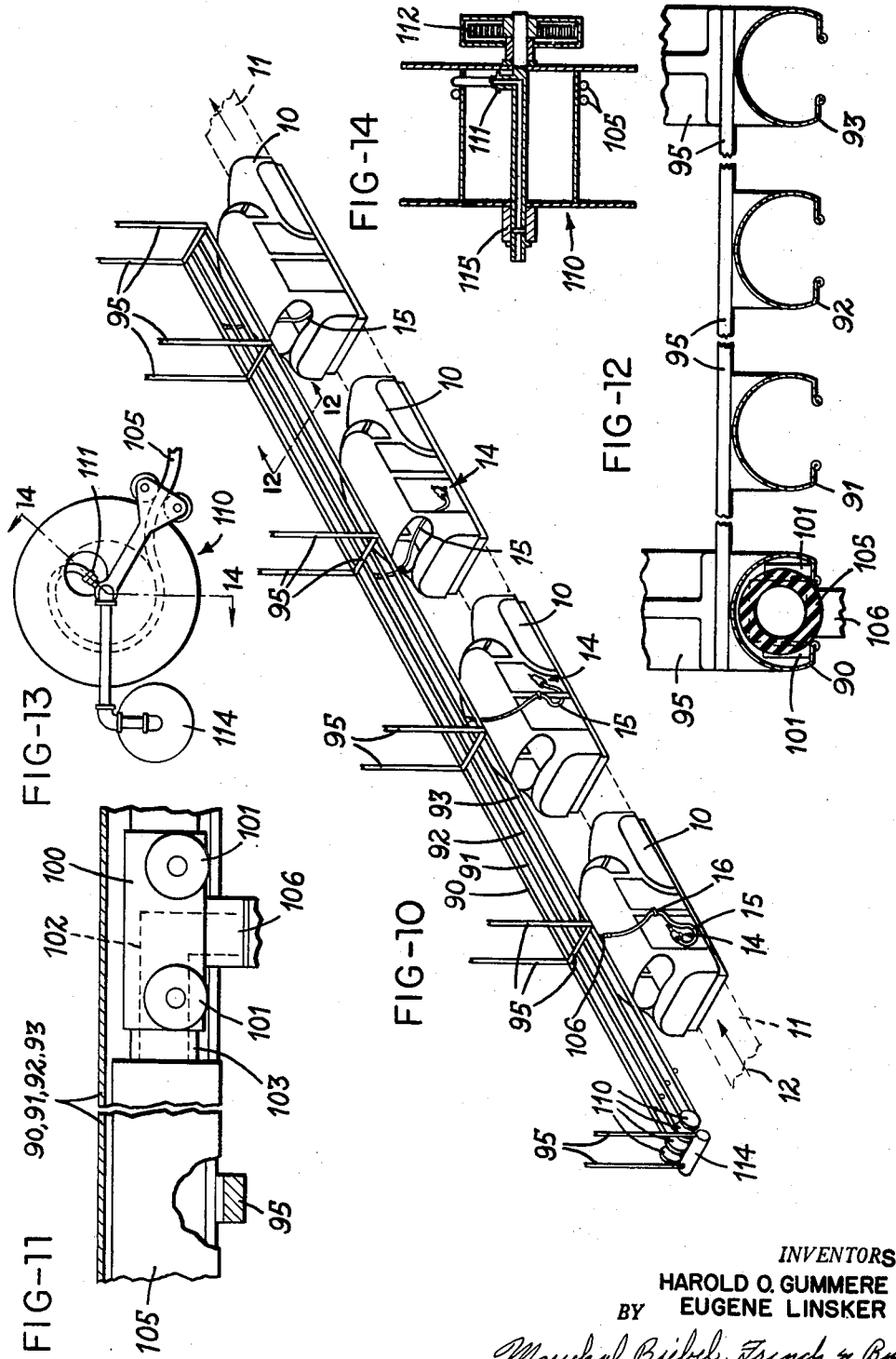

United States Patent Office 2,831,501
Patented Apr. 22, 1958

2,831,501

AIR SUPPLY SYSTEM FOR PNEUMATIC TOOLS

Harold O. Gummere and Eugene Linsker, Dayton, Ohio, assignors to Buckeye Tools Corporation, Dayton, Ohio, a corporation of Ohio Application July 20, 1955, Serial No. 523,273

4 Claims. (Cl. 137—561)

This invention relates to a system for continuously supplying air under pressure to pneumatic tools moving along a production line. Such tools are well suited for use in mass production activities, since they provide relatively high power for their size, and thus a small, portable, hand operated tool, having a high power output may be used for drilling, driving screws, grinding, etc. These tools are of rugged construction capable of withstanding the rough treatment received when used in mass production work. However, the difficulty of providing a constant supply of high pressure motive fluid, usually compressed air, for their motors has presented a disadvantage to the application of pneumatic tools to jobs on production line work. A long air supply hose attached to the tool is unwieldy and apt to become entangled in other apparatus. Furthermore, if several workmen are operating along the same portion of a production line and continually crossing each others paths, the long air hoses of their tools would in such instance, be a constant source of annoyance and trouble in keeping them from becoming intertwined.

Accordingly, it is a primary object of this invention to provide a system for continuously supplying air under high pressure to pneumatic tools as these tools are carried along a moving production line.

Another object of the invention is to provide such a system wherein a plurality of quick-disconnect couplers are supported at spaced intervals from each other and joined into a closed loop by lengths of air-tight conduit, and wherein the closed loop is supported for movement along its own length with a portion of the loop extending parallel to a moving production line.

A further object of the invention is to provide a system for supplying motive fluid to pneumatic tools moving along a production line wherein a number of quick-disconnect couplers are supported for movement along with the production line and are continuously connected to a source of high pressure air, whereby pneumatic tools carried along with the production line may be supplied with motive fluid from the couplers while moving along with the production line.

An additional object of this invention is to provide such a system wherein the quick-disconnect couplers are attached at regularly spaced intervals to a loop of flexible conduit which is continuously connected to a source of high pressure air and supported so that a portion of the loop extends parallel to a portion of a production line, and wherein means are provided for moving the conduit along its own length to move the couplers along in correlated relation with movement of the production line.

Other objects and advantages of the invention will be apparent from the following description, the accompanying drawings and the appended claims.

In the drawings—

Fig. 1 is a perspective view of the system in accordance with the invention for continuously supplying motive fluid to pneumatic tools moving along a production line;

Fig. 2 is an enlarged detail section taken along line 2—2 of Fig. 1;

Fig. 3 is a view on an enlarged scale of the connection for continuously supplying air to the moving loop of conduit utilized in the system of Fig. 1;

Fig. 4 is an enlarged detail, partly in section and partly in elevation, of one of the quick-disconnect couplers utilized in the system of Fig. 1;

Fig. 5 is a side view of the coupler seen in Fig. 4, with the tool supply hose removed, and with a portion of the supporting track shown in section;

Fig. 6 is a perspective view of a modified form of motive fluid supply system similar to the system seen in Fig. 1;

Fig. 7 is an enlarged and broken detail view of one of the pulleys seen in Fig. 6;

Fig. 8 is an enlarged detail section of a modified track which may be utilized in the system of Fig. 1 or Fig. 6;

Fig. 9 is a detail view of a modified coupler arrangement;

Fig. 10 is a perspective view of another type of system for supplying motive fluid to pneumatic tools as they move along a production line;

Fig. 11 is an enlarged detail view of one of the trolleys utilized in the system of Fig. 9;

Fig. 12 is a section on an enlarged scale taken along lines 12—12 of Fig. 10;

Fig. 13 is an enlarged view of a reel used in the system of Fig. 10; and

Fig. 14 is a section along line 14—14 of Fig. 13.

Referring to the drawings, which illustrate preferred embodiments of the present invention, Fig. 1 shows a system for supplying air under pressure to pneumatic tools in accordance with the invention. In the course of mass production manufacturing the articles being manufactured are moved progressively past successive work stations, at which stations certain steps of the manufacturing process are performed. For example, three successive such stations might be for drilling holes, tapping these holes, and driving screws into the tapped holes, or two or more such steps might be performed by a single workman at one work station.

At each station a workman with his tools moves along the production line with a particular article as it passes through his work station and performs certain operations on the article. At the end of his work station, having completed his tasks, he returns with his tools to the beginning of the work station and begins working on the next article coming along. In the meantime, other workmen at the same station are performing like operations on the articles on the production line which are intermediate the two articles the first workman has handled. Thus, several workmen are continually moving back and forth along the work station and across each others paths.

The term "production line" may be applied broadly to any such arrangement wherein articles being manufactured are moved past such a series of stations or successive operations. This term as used in the following specification and claims is intended to denote any arrangement wherein a plurality of work stations are arranged in succession, and through which stations articles being manufactured are progressively moved. The movement of these articles may be continuous or intermittent, and may be effected either manually or mechanically, as by a conveyor.

For purposes of illustration, a production line is shown in Fig. 1 as including a number of automobile bodies 10 being moved by a suitable conveyor 11 in the direction of arrow 12 through a work station. For simplification it will be assumed that only one operation is being performed, and that only one work station is included, in the illustration of Fig. 1. It is to be understood, however, that this illustration could just as well denote several successive work stations at which successive steps of the manufacturing operation are being performed.

In each of the automobile bodies 10 an operation is being performed by a workman carrying a portable pneumatic tool, one of which is shown generally at 14, and each of these tools includes a short length of air supply hose 15 having a clip 16 thereon for attachment to some suitable portion of car body 10 or some other moving portion of the production line. Thus, as the bodies 10 moves along the production line, the pneumatic tools 14 and their associated supply hoses 15 are carried along with the production line, moving generally from left to right as viewed in Fig. 1.

Referring to Fig. 4, the inlet end of one of the supply hoses 15, that is, the end opposite from tool 14, terminates in a connecting nipple indicated generally at 20 and having an end portion 21 of reduced diameter upon which is carried an annular shoulder 22. The nipple 20 includes an internal bore 23 communicating with the interior of hose 15 and adapted to supply motive fluid to this hose for passage to the pneumatic tool. Nipple 20 constitutes one portion of a quick-disconnect coupler, a number of which are indicated in Fig. 1 at 25. The receiving portion of these couplers includes a body 26 having a bore 26′ therein, and also having a plurality of pins 27 arranged for oblique radial movement therein, so as to be urged by the inturned upper portion 28 of a sleeve 30 into locking engagement beneath the nipple shoulder 22. A spring 31 urges sleeve 30 and body 26 axially apart to force pins 27 under shoulder 22. To attach nipple 20 into body 26, it is necessary only to push the nipple portion into the annular opening 26′ until the shoulder 22 is seated above pins 27. To release nipple 20 and hose 15 the operator merely pushes sleeve 30 upwardly against the force of spring 31, and draws the nipple downwardly, the pins 27 riding radially outwardly away from shoulder 22 since they are no longer obstructed by the edge 28 of sleeve 30.

Fig. 1 shows a circuit of track 35 formed in the shape of a flat-sided oval and supported by suitable braces 36 so that one side of the track circuit extends substantially parallel to the production line. Referring to Fig. 2, this track is shown as tubular, being an incomplete cylinder in cross section, and having flat portions 37 terminating in beaded or rolled-over edges 38 which define a longitudinal opening 40 in the bottom of track 35. Each of the quick-disconnect couplers 25 is supported from track 35 by a trolley including a body 45 (Figs. 4 and 5) having a plurality of wheels 46 thereon which ride upon the flat portions 37 of the track. Each trolley has a through passage 47 terminating in suitable connecting portions 48 to which lengths of flexible conduit 50 are attached, thereby joining all of the trolleys 45, and establishing a predetermined spacing thereof, for the purpose of supplying air under pressure to each of their passages 47.

Furthermore, each trolley body 45 includes a depending portion 52 having a bore 53 therein communicating with passage 47, and terminating in a counterbored portion 54. The lower end of portion 52 is threadably connected at 55 to coupler body 26, and a spring-pressed shut-off valve member 57 is retained within the counterbore 54 to be urged against a seat 58 carried on the top of coupler body 26. A suitable spider 60 presses against the lower face of valve 57, and is engaged by the end of reduced nipple portion 21 when the nipple is inserted to open the valve and admit high pressure air into tool supply hose 15 from passage 47.

Couplers 25, by reason of the relatively close fit of trolley body 45 within the track 35 is supported to resist any substantial vertical movement in either an upward or downward direction during the course of travel of the coupler along with the production line. Accordingly, when a workman thrusts the nipple 20 of his tool supply hose into a coupler 25, the trolley body will move slightly upwardly, until it abuts the curved top of track 35, and will then resist further movement to provide a firm abutment for the trolley as the connection between the nipple and coupler 25 is completed and pressure air is supplied to the tool. Likewise, when it is desired to disconnect the tool supply hose the workman pushes upwardly upon sleeve 30 and draws nipple 20 out of the coupler, and any downward movement of the coupler body is prevented by wheels 46 resting on the flat track portions 37 and providing a lower abutment.

Air under pressure is supplied from a suitable source indicated generally as a supply pipe 65 which is supported adjacent the center of the track circuit and which may be connected to any convenient pressure air system in the shop or factory, for example, a motor driven air compressor. As shown in Fig. 1, pipe 65 carries a swivel type coupling 66 at its lower end capable of continuous rotation about the end of pipe 65, and attached to a central supply hose 67 extending beneath braces 36 and in turn attached to a full swivel connector 68 shown in detail in Fig. 3 as carried by a suitable trolley 70. Trolley 70 is similar to coupler trolleys 45, and has a central supply passage 72 to which compressed air is supplied, and is in turn attached to a length of flexible conduit 50 for passage of the compressed air to the couplers 25. Supply hose 67 is suitably coiled to expand and contract as the supply trolley 70 moves about the track circuit, toward and away from the central air supply pipe 65.

During operation of the system seen in Fig. 1, the workman carrying a pneumatic tool plugs his tool supply hose into the closest coupler 25 at the beginning of the work station, attaches his clip 16 to the car body or to some other portion of the moving production line, and proceeds to complete the operations performed at his work station. During the course of such operations the production line moves along, and the pull through tool supply hose 50 is transmitted through coupler 25 to the associated trolley 45, thus pulling the trolley, and the lengths of flexible conduit 50 connected thereto, along in coordinated relation with the production line. The number of couplers 25 connected to the air supply circuit may vary in accordance with the spacing desired in a particular production line, and in accordance with the number of tools to be operated and workmen located at each work station. In the example of Fig. 1 the couplers are equally spaced along track 35 to provide one moving air supply adjacent each car body 10. It is apparent that this arrangement may be varied in whatever way necessary to the application of this device to a particular production line.

For example, Fig. 9 shows one of the trolley bodies 45 as having a T connection 71 depending therefrom, and at the opposite ends of T 71 are short pipe lengths 72, to each of which is attached a quick-disconnect coupler 73 of the same general construction as couplers 25. This modified arrangement provides for supply of pressure air to different tools carried by one workman, or to the tools of workmen operating in pairs.

When the workman has completed his task he disconnects his supply hose from the coupler, returns with his tool to the beginning of his work station, connects to the coupler then adjacent the beginning of that station, and proceeds to perform his tasks on the next car body coming along the production line.

Referring to Fig. 6, a modified air supply system is shown, and all parts identical to the mechanism of Fig. 1 are given like reference numerals. In this modified form of apparatus the curved end sections of track 35 are removed, and the flexible conduit 50, together with the air supply trolleys attached in circuit with the conduit, are fed around a drive pulley 75 at one end, and an idler pulley 76 at the other end, of the loop. The drive pulley 75 is turned at a speed corresponding to the movement of the production line, so that the couplers 25 move along track 35 in coordinated relation with movement of the production line. The drive mechanism is indicated generally at 78 as including a drive motor 79 and suitable reduction gearing. It is of course obvious that any suitable drive mechanism will suffice, and in fact, the drive may be through a suitable power take-off from the main production line drive.

As the flexible conduit leaves track 35 at opposite ends of the system, it moves into the grooves 80 of pulleys 75 and 76. When two lengths of conduit 50 having a trolley 45 therebetween pass onto the pulleys, the inner wheel 46 of the trolley is received within slots 82 at the bottom of grooves 80, and these slots are suitably lined with resilient material 83 such as plastic, rubber or the like, to prevent damage to wheels 46. Thus, the trolleys and the flexible conduit connecting them pass about the pulleys, and the frictional engagement of the pulley groove 80 with these members is sufficient at the drive pulley 75 to transmit the drive force to the complete loop of trolleys and flexible conduit.

Referring to Fig. 8, there is shown a modified type of track 85 which may be substituted for the track 35 in either of the mechanisms of Fig. 1 or Fig. 6. Track 85 is generally rectangular in cross-section, and has a slot 86 in its lower face defined by curled-under portions 87 of the track for passage of the lower trolley portions 52 therethrough.

Fig. 10 illustrates another modification of the present invention wherein a plurality of tracks 90, 91, 92 and 93, respectively, are supported by suitable bracing 95 to extend parallel to each other and along the length of a work station on a production line. Again, the production line is indicated generally by a plurality of car bodies 10 moving in the direction of arrow 12 beneath the tracks. Each of these tracks is similar in cross-section to track 35, and a trolley 100 (Fig. 11) having wheels 101 is supported for movement in each of the tracks 90, 91, 92 and 93. Each of these trolleys has a generally L-shaped air passage 102 therein and the horizontal leg of this passage terminates in a connector 103 attached to a flexible conduit 105. The lower or vertical leg of passage 102 terminates in a lower coupler portion 106 to which suitable quick-disconnect couplers 25 may be attached.

This entire trolley and conduit arrangement is duplicated in each of the four tracks. At the end of each track corresponding to the beginning of the work station a suitable reel 110 is supported with the corresponding track extending tangentially to the periphery thereof, and the ends of conduit 105 opposite from trolleys 100 are connected within these reels at 111 so that the conduit will be coiled therewithin in a known manner under the influence of a suitable motor, shown in the example of Fig. 14 as a spring 112 tending to draw trolleys 100 toward the reels. An air supply manifold 114 is supported adjacent the reels 110 and through these reels and suitable swivel couplings 115 air is supplied from the manifold to the conduits 105. As in the system of Fig. 1, the operator attaches his tool supply hose 15 to a coupler on one of the conduits 90—93, and attaches clip 16 to some moving part of the production line. As the production line advances the pull transmitted through supply hose 15 and the coupler draws the conduit 105 out from its associated reel 110 in coordinated relation with the production line until the car body or the like upon which the operator is working reaches the end of the work station. The operator then disconnects his supply hose from the coupler, and the trolley is drawn back to starting position by the spring or other motor within reel 110. By providing a plurality of tracks and conduits it is possible to have a number of couplers at different positions along the work station at any given moment, as illustrated by the different positions of the four supply hoses 15 in Fig. 9.

Accordingly, the present invention provides a system which will continually supply pressure air to motivate a number of pneumatic tools as they are used to perform operations on articles carried on a moving production line. The tools may be taken, in succession, with the production line from start to finish in the course of the operations, and may be returned to the head of the work station through which the articles pass as the certain operations are performed without fear of entangling the tool supply hoses with other apparatus, or with the supply hoses on the other tools following along the production line. The relatively short tool supply hoses which may be used because of the advantages provided by the present invention may be quickly and easily connected to and disconnected from the system without interfering with the operation of the production line or its continuity of movement.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a system for supplying motive fluid to pneumatic tools moving along a production line, the combination of an elongated closed loop of flexible conduit, a plurality of couplers attached to said conduit at spaced intervals thereon, a tubular track enclosing a major portion of said conduit, said track having an elongated longitudinal opening in the bottom thereof providing access to said couplers for attachment thereto of a supply hose for a pneumatic tool used on the moving production line, means for supporting said track in an elevated position, means for moving said conduit through said track, and a source of air under pressure continuously connected to said loop of flexible conduit to provide a moving supply of motive fluid for tools used on the production line.

2. In a system for continuously supplying pressure air to pneumatic tools to enable use thereof during movement along a production line, the combination of an endless tubular track in the shape of a flat-sided oval, said track having a continuous longitudinal opening in the bottom thereof, means supporting said track in an elevated position with respect to the production line and a plurality of trolleys within said track and movable along said track, couplers carried by said trolleys including portions extending through said opening in said track for attachment with tool supply hoses, means for moving said trolleys along said track, flexible conduit means connecting successive said couplers in spaced relation and providing an air supply loop movable within said track, the interior upper surface of said track providing abutment means for engaging said trolleys and resisting vertical movement thereof during connection and disconnection of tool supply hoses with said couplers, normally closed valve means in each said extended portion of said couplers for preventing flow of pressure air therethrough, said valve means being openable upon connection of the respective said coupler with a tool supply hose, and means for continuously supplying pressure air to said loop during movement thereof along said track to continuously maintain a supply of pressure air at said couplers for motivating the pneumatic tools.

3. A system for supplying pressure air for driving portable pneumatic tools to enable use thereof during movement along a continuously moving production line, comprising the combination of a tubular track having an elongated longitudinal opening extending along a substantial length of the bottom thereof, means supporting said track in an elevated position, a trolley on said track, means for producing movement of said trolley along said track, a coupler carried by said trolley, said coupler including a normally closed valve openable upon attachment of a tool supply hose thereto to supply pressure air to the tool during movement of the tool along the production line, a stationary source of high pressure air, and a flexible conduit extending through said tubular track and continuously connecting said source to said coupler during movement of said trolley along said track.

4. In a system for supplying motive fluid to pneumatic tools moving along a production line, the combination of a closed loop of flexible conduit, a plurality of couplers attached to said conduit at spaced intervals thereon, spaced means including at least one pulley for receiving and guiding said conduit at opposite ends of said loop, tubular track sections enclosing the opposite sides of said conduit loop and supporting said conduit for passage therethrough, means supporting one of said track sections in elevated position, trolley means on said couplers receivable in said track sections for supporting said couplers during passage thereof along said track sections, means for rotating said pulley to move said conduit along its own length about said loop, said track sections having continuous longitudinal openings through the bottoms thereof, said couplers including portions extending through said openings, means including a normally closed valve in each said extended coupler portion providing for quick attachment of a pneumatic supply hose thereto, means for opening said valves upon connection of a supply hose to the associated coupler, a stationary source of pressure air supported adjacent said loop, and means continuously connecting said source to said loop providing a supply of motive fluid at each of said couplers as they move along said track.

References Cited in the file of this patent

UNITED STATES PATENTS

| | | |
|---|---|---|
| 1,148,690 | Klingensmith | Aug. 3, 1915 |
| 2,702,149 | Harrison | Feb. 15, 1955 |
| 2,715,912 | Cameron | Aug. 23, 1955 |
| 2,720,217 | Vossbrinck | Oct. 11, 1955 |